June 14, 1966 P. G. ANNABLE ETAL 3,255,904

METHOD OF ASSEMBLING INTERFITTING BLOCK ARRAYS

Filed Oct. 11, 1963 3 Sheets-Sheet 1

INVENTORS
PAUL G. ANNABLE
WAYNE G. DASHER
BY
Blair + Buckles
ATTORNEYS

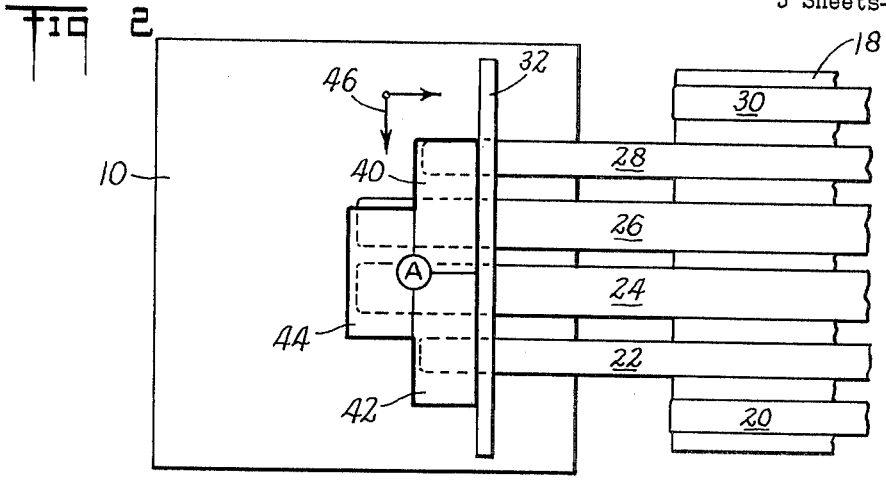
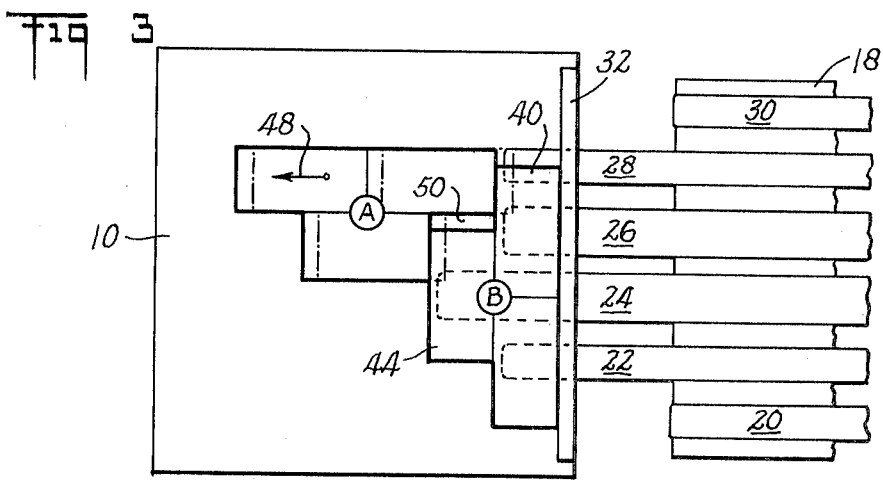
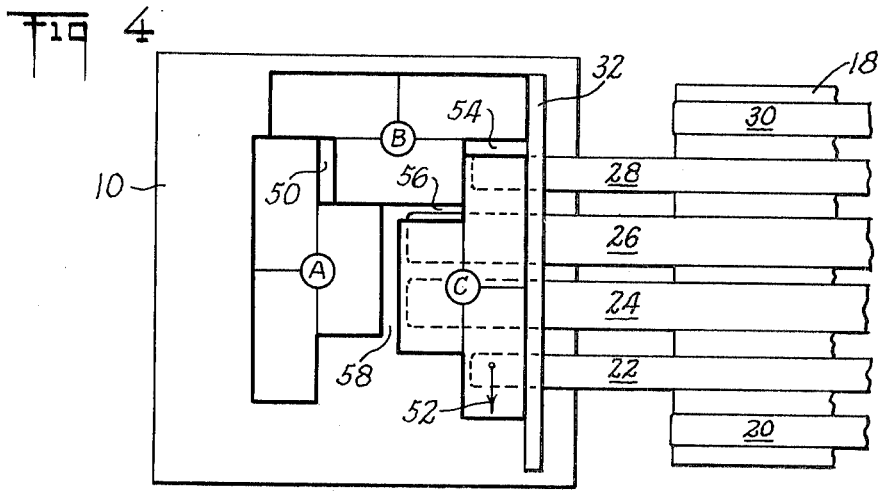

United States Patent Office 3,255,904
Patented June 14, 1966

3,255,904
METHOD OF ASSEMBLING INTERFITTING BLOCK ARRAYS
Paul G. Annable and Wayne G. Dasher, Danbury, Conn., assignors to Connecticut Research Associates, Incorporated, Danbury, Conn.
Filed Oct. 11, 1963, Ser. No. 315,719
6 Claims. (Cl. 214—152)

This invention relates to a method for assembling blocks into an interfitting rectangular layer of blocks and the formation of such layers into an interlocking "cube." This application is a continuation-in-part of our application, Serial No. 211,063, filed July 19, 1962, and entitled "Block Stacking Method and Apparatus."

The method of our invention is particularly applicable to the handling and transporting of concrete blocks and the like wherein such blocks are preferably stacked in a plurality of interlocking layers for storage and transport. Handling such blocks by hand is quite expensive, since a great amount of labor is required to place the blocks into interlocking cubes. We have therefore invented a fully automatic machine which handles the blocks in three-block pyramidal modules of two base blocks and an apex block. This is the basic unit for assembling interfitting block layers and interlocking block cubes. This apparatus and certain methods of forming block cubes are the subject of our above-identified co-pending patent application.

We have discovered that in handilng some types of blocks that alignment tolerances of the block and the block module handling apparatus must be maintained to a fairly high degree or a block layer may be disarrayed by the catching of edges as the block modules are assembled.

Accordingly, it is a principal object of this invention to provide a method of assembling blocks into a rectangular interfitting layer;

Another object of the invention is to provide a method of the above character wherein the rectangular layers may be used to form an interlocking cube of blocks.

A further object of the invention is to provide methods of the above character wherein disarrayment of a partially formed block layer is kept at a minimum;

Another object of the invention is to provide methods of the above character wherein alignment tolerances of the apparatus do not have to be precise and which may be programmed for automatic operation.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings, in which:

FIGURES 2–6 are top diagrammatic sequential views of the formation of a block layer in accordance with the invention.

Figure 1:
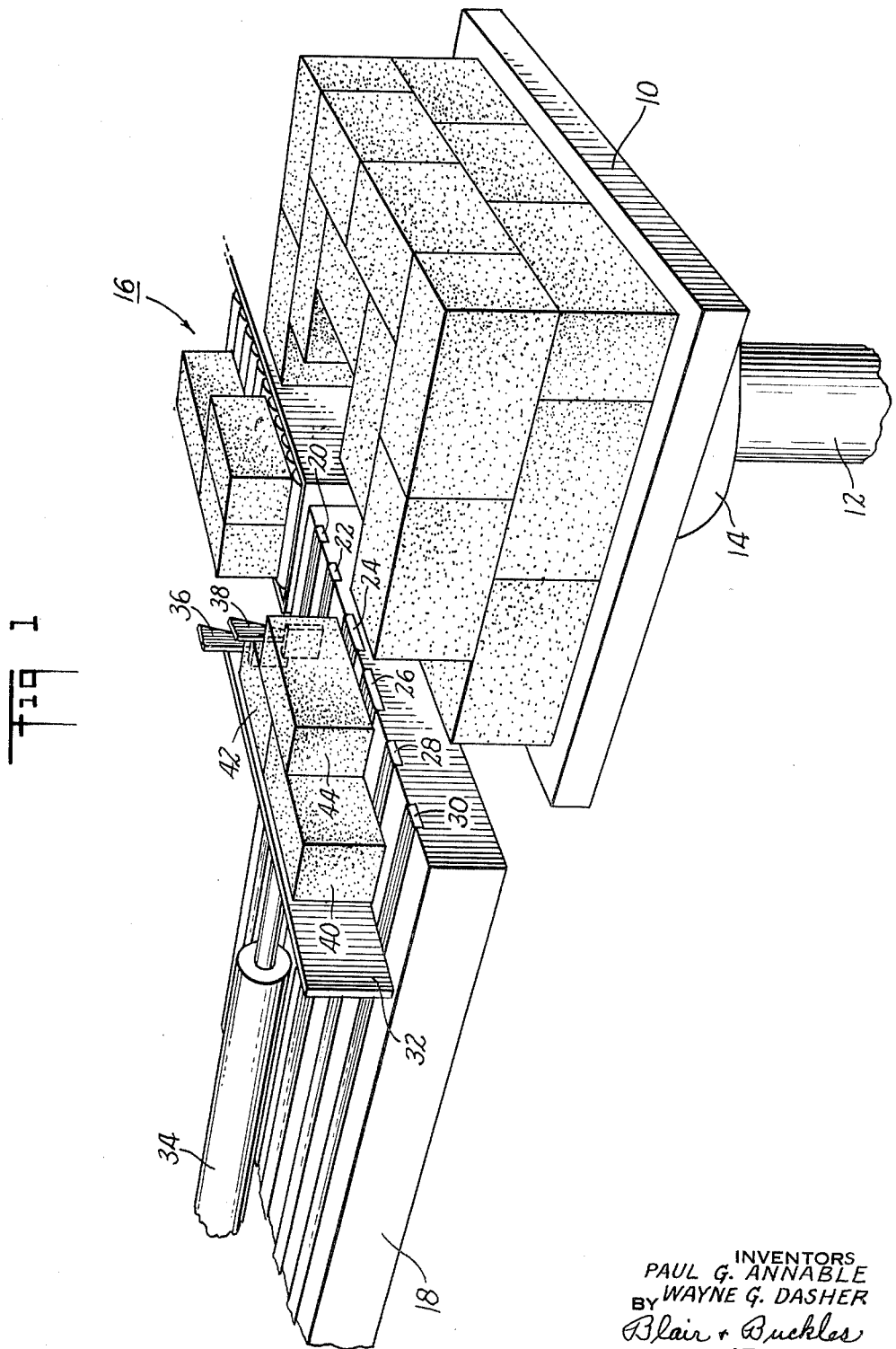
FIGURE 1 is a partial diagrammatic perspective view of a machine for handling concrete blocks and for forming them into interfitting layers and interlocking cubes.

Referring now to FIGURE 1, the type of machine for handling concrete blocks according to our method will be described. The blocks are moved into position on a rotatable platform 10 supported by a hydraulic ram 12 for raising or lowering the platform 10 to any desired height. Mechanism (not shown) for rotating the platform 10 is contained in the housing 14 below the platform. The blocks are marshalled in two rows from a marshalling area 16 from which they are placed on a finger table 18 in pyramidal modules as shown in FIGURE 1, or in a single row of three linear blocks to form a linear module.

The finger table 18 is provided with extendable and retractable fingers 20, 22, 24, 26, 28 and 30 (FIGURE 2) for transporting the blocks to the platform 10. A pusher plate 32 having a hydraulic ram 34 (FIGURE 1) is positioned over the fingers 20–30, and is extendable and retractable with the fingers to deposit block modules on the platform 10 when the fingers are withdrawn. Block pushers 36, 38 move the blocks from the marshalling area 16 in pyramidal or linear modules and position the blocks laterally on the finger table for deposition onto platform 10. The pushers 36, 38, the stop plate 32, and fingers 20–30 are all sequentially programmed to place a group of blocks on the platform 10 (or on top of a preceding block layer) at predetermined positions.

A typical sequence in the placing of a three-block module on platform 10 is as follows. Pushers 36, 38 receive three blocks from the marshalling area and move the blocks in two rows as a pyramidal module having base blocks 40, 42 and an apex block 44, which is centered on the two base blocks. Thus the programmed movement of the pushers 36, 38 not only form the three blocks into the proper module, but they also position the module laterally on the finger table 18 for movement onto the platform 10. Pushers 36, 38 are then retracted and the pyramidal module is carried forward to be deposited on the platform 10 by the appropriate group of fingers. The pusher plate 32 is moved with the fingers a corresponding distance, and when the fingers supporting the blocks are retracted, the plate 32 remains in position until finger retraction is completed, to deposit the blocks in their proper positions on the platform 10. As soon as the fingers are retracted, the plate 32 is also retracted, and the platform 10 is rotated 90° to receive another three-block module, the pushers 36, 38 then positioning another module in the proper position on the finger table. For a more detailed description of such a machine, reference is made to our above-cited co-pending application, Serial No. 211,063.

Referring now to FIGURES 2–6, the method of forming rectangular arrays and interlocking cubes of blocks will now be described. The method provides for spacing between portions of the three-block modules that are being positioned so that alignment tolerances of the array forming apparatus do not have to be held as close to avoid block displacement difficulties.

The modules are sequentially positioned on the platform 10 in a loosely interfitted array with the apex blocks of each module positioned toward the center of the array. Gaps are formed between adjacent modules when sequentially placed to eliminate interference of one module with another during initial placement. These gaps are then closed by pushing the module array on two base sides to close up gaps in two directions between adjacent modules. The temporary positioning of some of the modules thus eliminates the possibility of disarraying a module on the platform during placement of succeeding modules.

The pyramidal and linear modules are formed and placed on the fingers as described above. For moving certain modules into position on the platform, however, the sequential programming of the fingers 20–30, plate 32 and of the pushers 36, 38 is preset to place the modules in the positions on the platform shown in FIGURES 2–6.

Thus the pushers 36, 38 are sequentially programmed to push the modules to different lateral positions over the finger table 18 and subsequently onto fingers 20–30 as described below.

Figure 5:
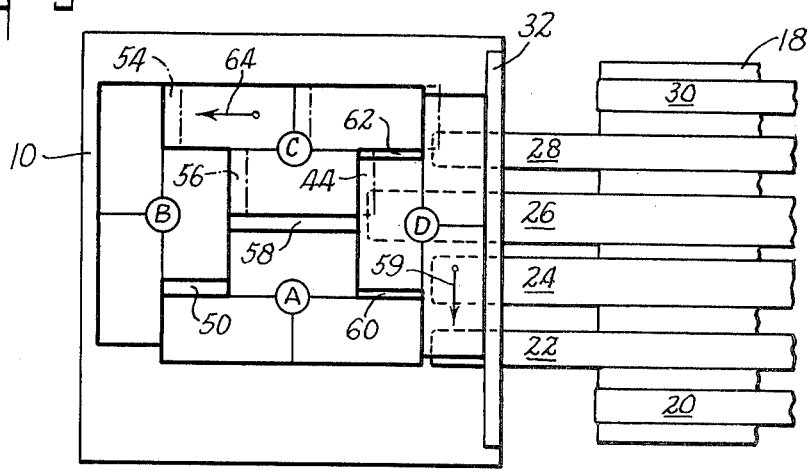
Figure 6:
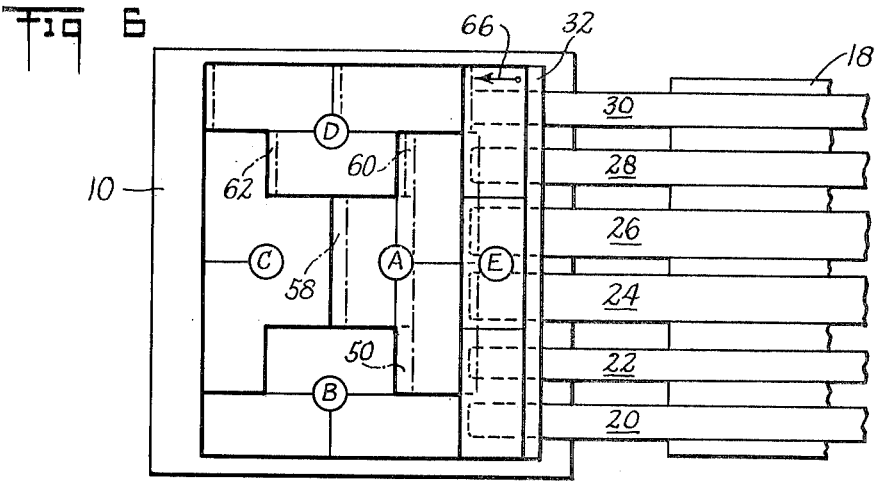

The fingers 20–30 are programmed to extend to different lengths to carry a three-block module for placement on the platform 10. Thus the center fingers 24, 26 carry the apex block of a pyramidal module, as shown in FIGURES 2 and 4, by initial extension beyond the other fingers prior to receiving a block module from the pushers 36, 38. Fingers 24 or 26 may support an apex block individually as shown in FIGURES 3 and 5, and are wider than the remaining fingers for this purpose. As shown in FIGURES 2–6, the fingers 20–30 and plate 32 are sequentially programmed to position the modules at varying distances from the platform edge.

As shown in FIGURE 2, a first pyramidal module A is positioned on and transported by the fingers 22–28 to be placed on platform 10. Module A is positioned on platform 10 in a position which is offset several inches in the two directions indicated by the arrows 46. Thus the module A is placed in a position which is short and to the left of its final position, looking at module A from its base 40, 42. As will be more fully explained hereinafter, module A will be shifted to its final position by the positioning of subsequent modules.

Referring now to FIGURE 3, it will be seen that module B is positioned on and transported by fingers 22–28 for placement on platform 10, after a 90° counterclockwise rotation of the platform. Module B is placed by the fingers and pusher plate 32 into its final position as shown by the full lines in FIGURE 3. In so doing the apex block 44 and base block 40 both engage edges of module A to move module A in the direction of arrow 48. Thus module A is moved to final position only in the direction of the arrow 48. Since module A was offset by several inches in two directions as shown in FIGURE 2, a gap 50 between modules A and B remains after the placement of module B.

Referring now to FIGURE 4, it will be seen that platform 10 is again rotated counterclockwise 90° to receive module C, which has been positioned for movement into the partially formed array by fingers 22–28 as shown. The fingers 22–28 and pusher plate 32 then move module C into the array to its final base line position, but offset several inches in the direction of arrow 52. Thus with module C deposited in the position shown in FIGURE 4, gap 50 between modules A and B remains, and gaps 54 and 56 are created between modules B and C, and gap 58 between modules A and C.

Referring now to FIGURE 5, it will be seen that the platform 10 is again rotated counterclockwise 90° to receive module D. Module D is transported by fingers 22–28 as shown in FIGURE 5 and is moved into the array by these fingers and pusher plate 32 to its final base line position but slightly offset in the direction of arrow 59. Thus apex block 44 of module D is approximately centered between the bases of modules A and C to form gaps 60, 62 between the adjacent base blocks of modules A and C respectively. Module D is moved into the array with its base line placed at final position and in so doing engages module C to move it in the direction of arrow 64 from its dashed line position to the full line position shown in FIGURE 5, thus closing gaps 54 and 56 (FIGURE 4).

Referring now to FIGURE 6, the platform 10 is again rotated counterclockwise 90° to receive linear array E which has been positioned on all five fingers 20–30 for placement on platform 10. The fingers 20–30 and pusher plate 32 move the linear module E to its final base line position, and in so doing move modules A and D from their dashed line positions to their final positions as shown in full lines in FIGURE 6. Thus the movement of module E into its final position closes all gaps in the direction of arrow 66, i.e., gaps 50, 58, 60 and 62 (FIGURE 5), and moves module D into its final position.

After positioning of linear module E and the withdrawal of fingers 20–30 and pusher plate 32, the platform 10 is then rotated 180° and is lowered the height of one block to begin the formation of the succeeding layer, repeating the sequence shown in FIGURES 2–6.

Thus the method of forming rectangular layers for interlocking cubical arrays as shown in FIGURES 2–6 merely requires the programming of lateral module positioning with respect to the fingers 20–30, and the stroke length of the fingers and pusher plate 32.

The gaps 50, 54, 56 and 62 are all formed by placement of modules in a temporary offset position, the offset being in a straight line essentially opposite the direction of platform rotation. Gaps 58 and 60 are formed because of the temporary placement of module A in a position short of its final position with respect to the center of the finally formed array.

The method has been found to be particularly advantageous, since tolerances in module positioning on the turntable platform are not nearly so critical. The allowance of gaps between various modules which are not closed up until the positioning of the last pyramidal module and linear array permits a higher speed operation, since lateral marginal alignment of modules on the fingers 20–30 does not have to be precise. If gaps 50 and 58 (FIGURE 5) for example, are 2 to 3 inches, then a 1 inch lateral misalignment of module D would not cause a problem of inadvertently disarraying the other other modules as module D is placed on the turntable.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. The method of assembling substantially identical blocks into an interfitting configuration, said blocks having lengths approximately twice their width, comprising the steps of
   (A) arranging the blocks into pyramidal modules,
   (B) sequentially placing four modules on a rotatable surface
      (1) in a loosely interfitting array,
         (a) with the apex blocks of each pyramidal module positioned toward the center of the array,
         (b) the second and third placed modules being moved to their base line positions upon placement,
      (2) each of the placed pyramidal modules being initially placed and temporarily spaced from the preceding module in a direction parallel to the base line of the module being placed,
   (C) rotating the module supporting surface 90° between the placement of each module,
      (1) the rotation being all in the same direction,
   (D) moving the fourth placed pyramidal module toward the array center during placement to close all gaps between pyramidal modules in the direction parallel to the base lines of the first and third placed pyramidal modules,
   (E) and then pushing the first placed module toward the array center to close all gaps between modules in the direction parallel to the bases of the second and fourth placed modules.

2. The method defined in claim 1 wherein the first pyramidal module is initially placed in a temporary position short of its final position with respect to the center of the module array.

3. The method of assembling substantially identical blocks into an interfitting configuration, said blocks having lengths approximately twice their width, comprising the steps of
  (A) arranging the blocks into pyramidal modules,
  (B) sequentially placing four modules on a rotatable surface
    (1) in a loosely interfitting array,
      (a) with the apex blocks of each pyramidal module positioned toward the center of the array,
      (b) the second and third placed modules being moved to their base line positions upon placement,
    (2) each of the placed pyramidal modules being initially placed and temporarily spaced from the preceding module in a direction parallel to the base line of the module being placed,
  (C) rotating the module supporting surface 90° between the placement of each module,
    (1) the rotation being all in the same direction,
  (D) moving the fourth placed pyramidal module toward the array center during placement to close all gaps between pyramidal modules in the direction parallel to the base lines of the first and third placed pyramidal modules,
  (E) placing a linear block module against the base of the first placed pyramidal module and against the ends of the second and fourth placed module bases, and then
    (1) moving the linear group toward the center of the array to close all gaps between modules in the direction parallel to the bases of the second and fourth placed pyramidal modules.

4. The method of interfitting substantially identical blocks on a surface, comprising the steps of
  (A) arranging the blocks into pyramidal modules,
    (1) having two base blocks placed end to end to form a longitudinal base, and
    (2) one apex block centered on the two aligned base blocks,
  (B) placing a first pyramidal module on a surface in a temporary position
    (1) offset in two directions, short of its final base line position and shifted toward the position of the next module to be placed,
  (C) rotating the surface 90°,
  (D) placing a second pyramidal module on the surface and
    (1) moving said second module during placement to its final position,
    (2) with a base and apex block of said second placed module abutting a base and apex block of said first placed module to move said first module in the direction parallel to the longitudinal direction of the base of said first placed module,
  (E) rotating said surface 90° in the same direction,
  (F) placing a third pyramidal module on the surface to its final base line position and opposing said first placed module
    (1) but offset therefrom so that a base block of said third placed module abuts the apex block of said second placed module on one surface only, with a gap between adjoining base blocks of said second and third placed modules and between the apex block of said third placed module and the apex blocks of said first and second placed modules,
  (G) rotating the surface 90° in the same direction,
  (H) placing a fourth pyramidal module on the surface
    (1) with its apex block abutting the apex blocks of said first and third placed modules,
    (2) the apex block of said fourth placed module being spaced on two sides from the base blocks of said first and third placed modules,
    (3) said fourth placed module being moved during placement into its final base line position to close all gaps between the modules in the direction parallel to the bases of said first and third placed modules,
  (I) rotating the surface 90° in the same direction and then
  (J) placing a linear module of three aligned blocks into their final positions by
    (1) pushing the linear module during placement against the base of said first placed module and the base ends of said second and fourth placed modules to close all gaps between modules in a direction parallel to the bases of said second and fourth placed modules.

5. The method of assembling substantially identical blocks on a surface, said blocks having lengths approximately twice their width, comprising the steps of
  (A) arranging the blocks in pyramidal modules
    (1) having two base blocks longitudinally aligned and one apex block longitudinally parallel to said base blocks,
  (B) placing a first pyramidal module on a surface
    (1) in a temporary position offset from its final position in two directions, short of its final base line position and shifted toward the position of the next module to be placed,
  (C) placing a second pyramidal module on the surface and abutting said first placed module in one direction with a gap between the base of said first placed module and the apex of said second placed module,
    (1) moving said second placed module to its final position during placement to move said first module to a final position in its base line direction,
  (D) placing a third pyramidal module on the surface to its final base line position
    (1) with its apex block opposing the apex block of said first placed module
    (2) but offset longitudinally therefrom in its opposing temporary position to abut the apex block of said second placed module with a base block while maintaining a gap between the apex block of said third placed module and the apex blocks of said first and second placed modules,
  (E) placing a fourth pyramidal module on the surface
    (1) with its apex block abutting the apex blocks of said first and third placed modules,
    (2) the apex block of said fourth placed module being spaced on two sides from the base blocks of said first and third placed modules,
    (3) said fourth placed module being moved into its final base line position as it is placed to close all gaps between modules in the direction parallel to the bases of said first and third placed modules, and then
  (F) placing a linear module of three longitudinally aligned blocks abutting the base of said first module and the base ends of said second and fourth placed modules, and
    (1) pushing the linear module against the base of said first placed module and the base edges of said second and fourth placed modules to close all gaps between modules in the direction parallel to the bases of said second and fourth placed modules.

6. The method of assembling substantially identical blocks into an interfitting configuration, said blocks having lengths approximately twice their width, comprising the steps of (A) arranging the blocks into pyramidal modules
  (1) having two base blocks placed end to end, and
  (2) an apex block longitudinally centered on the two base blocks;
(B) sequentially placing four modules on a rotatable surface
  (1) in a predetermined spaced interfitting array,
    (a) with the apex blocks of each pyramidal module positioned toward the center of the array,
    (b) the second and third placed modules being moved to their base line positions upon placement,
  (2) each of the placed pyramidal modules being initially placed and temporarily spaced from the preceding module in a direction parallel to the base line of the module being placed to form gaps between adjacently placed modules,
(C) rotating the module supporting surface 90° between the placement of each module,
  (1) the rotation being all in the same direction,
(D) moving the fourth placed pyramidal module toward the array center during placement to close all gaps between pyramidal modules in the direction parallel to the base lines of the first and third placed pyramidal modules,
(E) and then pushing the first placed module toward to array center to close all gaps between modules in the direction parallel to the bases of the second and fourth placed modules.

References Cited by the Examiner

UNITED STATES PATENTS

| | | |
|---|---|---|
| 2,630,214 | 3/1953 | Reed. |
| 2,675,928 | 4/1954 | Slater. |
| 2,883,074 | 4/1959 | Boehl et al. |
| 2,902,182 | 9/1959 | Thomas _____ 214—152 |

FOREIGN PATENTS 815,246   10/1951   Germany.

GERALD M. FORLENZA, *Primary Examiner.*

MORRIS TEMIN, HUGO O. SCHULZ, *Examiners.*